Jan. 26, 1937. T. A. MITCHELL 2,068,690
METHOD OF RECOVERING COMPOUNDS FROM ZINC AND LEAD ORES
Filed Jan. 10, 1935
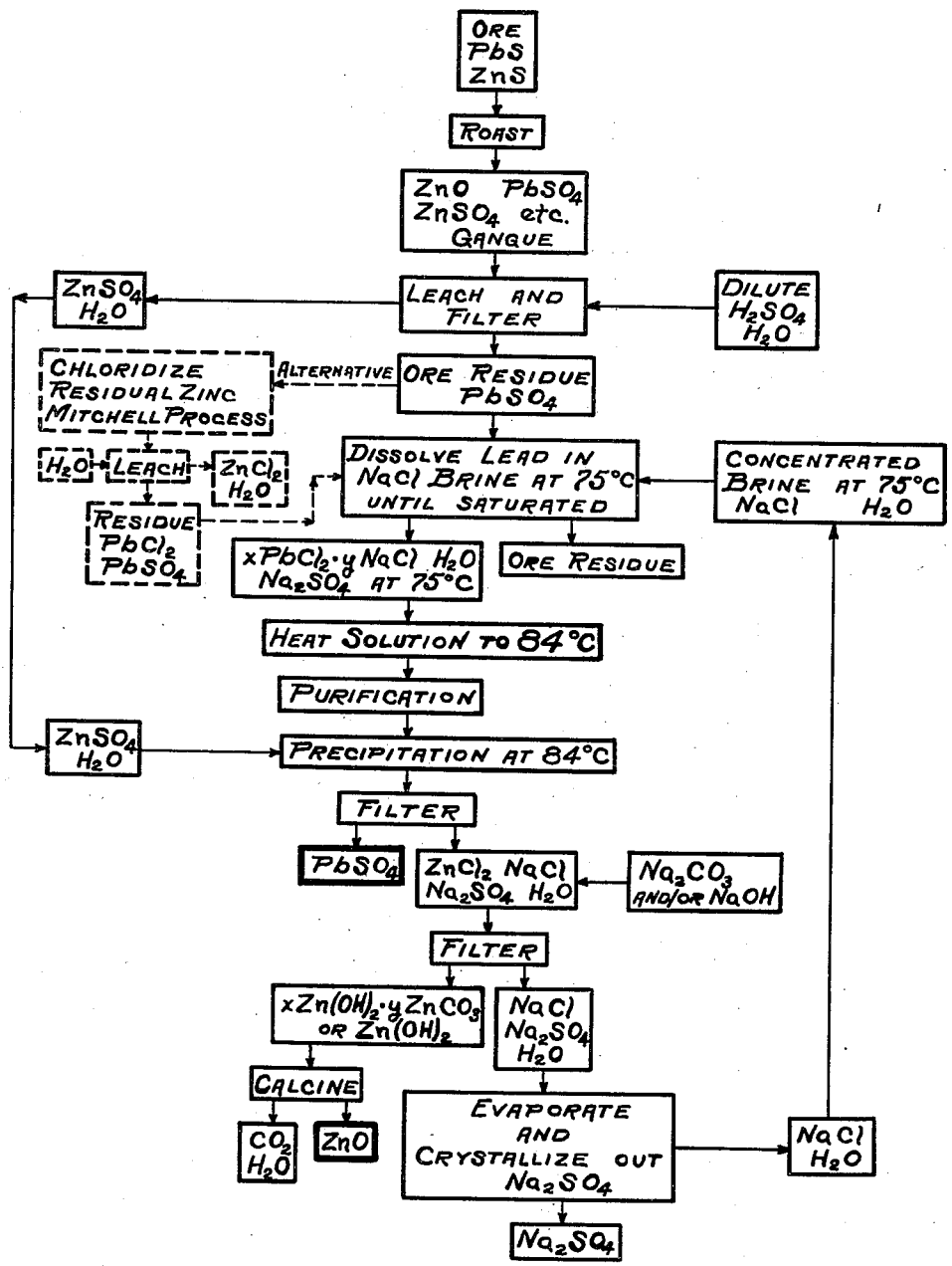
Inventor
THOMAS A. MITCHELL
By Clayton L. Jenks
Attorney Patented Jan. 26, 1937

2,068,690

UNITED STATES PATENT OFFICE 2,068,690

METHOD OF RECOVERING COMPOUNDS FROM ZINC AND LEAD ORES

Thomas A. Mitchell, Inglewood, Calif., assignor to Hughes-Mitchell Processes, Incorporated, Denver, Colo., a corporation of Wyoming Application January 10, 1935, Serial No. 1,186

9 Claims. (Cl. 75—120)

This invention relates to the recovery of lead and zinc compounds from a complex ore material, and particularly to the production of lead sulfate and various compounds of zinc.

Lead is commonly found associated with zinc and other ore metals in sulfide ores, and many problems have been met heretofore in the separation of these ore metals and their direct recovery as valuable compounds. In fact, many processes, such as ore smelting, which serve for recovering either of these metals from a simple ore, do not recover both of the metals when the two efficiently or economically are found intimately associated in a complex ore.

One object of the invention is to so treat such a complex lead and zinc ore that lead and zinc compounds may be recovered serially, and particularly to provide a method in which the zinc of the ore may aid in the production of the desired lead compound.

A further object comprises so carrying on the treatment of a complex lead and zinc ore material that the lead and zinc may be recovered by a low temperature solution and precipitation method which, in particular, results in the production of valuable lead and zinc compounds without necessitating converting the lead and zinc of the ore material to metals as intermediate products.

In accordance with one phase of this process, lead may be recovered from such a complex ore or from other desired materials as a solution of lead sulfate and/or chloride in a hot sodium chloride brine or as a water solution of lead nitrate, chloride or acetate. A further object of this invention is, therefore, to so treat such a solution that lead sulfate may be produced therefrom by a method which is efficient and economical and which does not add to the solution any ions incapable of being easily recovered or which are detrimental to subsequent steps of the process. Further objects will be apparent in the following disclosure.

The drawing illustrates as a flow diagram the treatment of a complex ore material which results in the recovery of lead sulfate and zinc carbonate, hydroxide or oxide, but the drawing is merely illustrative of one phase of the invention since other lead bearing materials may be treated for the production of lead sulfate therefrom.

In accordance with this invention, lead sulfate may be precipitated from a sodium or other alkali metal chloride brine solution of lead chloride and/or lead sulfate by means of zinc sulfate. This accomplishes many useful results. In particular, the use of zinc sulfate instead of some other reagent serves to introduce no ion into the solution which cannot be readily removed from the brine and usefully employed in the process. It is especially advantageous that the reagent is a principal ingredient of a common lead ore, so that one element of the ore may be used in the recovery of another. Hence, by removing the zinc from the complex sulfide ore as a sulfate, this product may be returned to process and employed usefully to take all of the residual lead chloride from solution. That is, zinc sulfate reacts with the complex brine containing lead, sodium and chlorine ions and removes all of the lead therefrom as insoluble lead sulfate. Also, zinc sulfate will precipitate lead sulfate from water solutions of lead chloride, nitrate or acetate derived from any suitable sources. By using this reagent, it is possible by the procedure herein described both to make the desired lead sulfate and to obtain a valuable zinc compound; hence, both reagents are converted to useful materials, and if desired the process may be partly cyclic in nature.

In the preferred practice of the invention, a complex ore containing lead and zinc compounds may be so treated as to recover a solution of zinc sulfate therefrom and to leave the lead in solution in a hot sodium chloride brine, whether the lead was originally in the form of lead sulfate or lead chloride. By combining the zinc sulfate, either in solution or as a dry salt, and the lead salt brine in proper proportions and under suitable conditions, lead sulfate may be directly precipitated from this brine and the zinc will then remain in solution as zinc chloride. This resultant solution may thereafter be so treated as to recover the zinc therefrom and, if desired, the chlorine ion may be again cyclically used in the process.

The precipitation of lead sulfate from a salt brine by means of zinc sulfate applies to the treatment of such a brine solution, from whatever source it may be derived; but in order that the entire process may be illustrated and described, reference is to be had to the accompanying drawing, which shows how a complex ore material containing lead and zinc sulfides may be so treated as to recover both the lead and the zinc as valuable marketable substances.

An ore containing lead and zinc sulfides may be preliminarily treated, as by a roasting operation, to convert a considerable portion of the zinc sulfide to zinc oxide and/or zinc sulfate, and the lead sulfide is preferably converted to the sulfate. Then, by leaching the roasted ore material with a dilute sulfuric acid solution, a solution of zinc sulfate is thereby recovered. This procedure may be carried on in accordance with standard practice and under suitable conditions to give a solution of required concentration, such as by repeatedly leaching the ore material with the same solution until it has been sufficiently concentrated for the reaction hereinafter described. If iron is present in the ore, a considerable amount of zinc oxide is left in the roast so as to prevent iron from going into the zinc sulfate solution, but all of the water soluble zinc compounds are to be removed, as by a second leaching operation, before the lead sulfate is dissolved. The recovery of the residual zinc in the ore is not a part of this invention, but it is to be understood that the zinc may be solubilized and recovered by any suitable procedure, such as that set forth in the prior Mitchell Patents Nos. 1,979,281 and 1,943,340, in accordance with which the residual zinc sulfide, oxide and other zinc compounds are converted to zinc chloride within the ore material, while the lead is left as a sulfate and/or chloride. Other procedures may, of course, be adopted.

For the sake of simplicity of illustration, it will be assumed that the ore material has been so roasted as to form lead sulfate therein. Hence, after the water soluble zinc compounds have been removed from the roasted material as zinc sulfate, the roast is then preferably treated with a strong or concentrated hot aqueous solution of sodium or potassium chloride so as to dissolve the lead sulfate therein. If the ore has been treated in accordance with the Mitchell process to form zinc chloride from the residual zinc compounds, as set forth in the Mitchell patents, then the finisher product is preferably leached with water to remove all of the soluble zinc and other compounds which might contaminate the salt brine solution. Thereafter, the zinc-free ore material is treated with the hot neutral salt brine to dissolve the lead sulfate and/or chloride in the finisher residue. The brine is preferably a concentrated solution of sodium chloride which is held at a temperature of 75° C. during the step of dissolving the lead sulfate and chloride, and the resultant solution may be saturated with respect to the lead.

The brine used for leaching the lead from the ore material may contain a considerable proportion of sulfate ions derived from the lead sulfate and be cyclically used in the process; but as sodium sulfate accumulates in the system, it should be separated from this brine by a suitable procedure, such as by evaporation and crystallization, whereby the crystals of sodium sulfate will be removed from the NaCl solution. This avoids having too strong a concentration of sulfate ions in the brine and thus impeding the solubilizing of the lead from the ore material. The lead bearing brine solution may contain other undesired compounds, in accordance with the nature of the ore material which is being treated, and these compounds will be suitably removed from the hot salt brine by any standard procedure which does not add objectionable ions to the solution, so that the salt brine will be of such a composition that only lead sulfate will be precipitated during the stage of treatment with the zinc sulfate. This purification is preferably applied to the lead salt brine since the undesired elements may be more easily removed at this stage than after the precipitation of the lead sulfate. For example, iron in solution may be removed by precipitating it as ferric hydroxide. For this purpose, one may use standard reagents for oxidizing the ferrous iron to the higher form and then converting it to the hydroxide. After the iron and other impurities have been precipitated, they are removed from the brine, as by filtration.

This brine is preferably raised to and held at a temperature of 84° C. so that it will not be saturated with respect to the lead and sodium ions therein during the purification and the subsequent step of precipitating the lead sulfate. Consequently, lead and sodium chlorides will not be precipitated by a minor temperature change. While maintained at this temperature of 84° C., the lead-sodium chloride brine, which may contain sodium sulfate, is combined with the zinc sulfate solution of substantially the same temperature, although dry zinc sulfate may be used if desired. The concentrations of the two solutions are preferably high and so chosen that the process will be efficient and economical; but because of this high concentration, care has to be taken to insure that undesired compounds do not appear in the lead sulfate. It is, therefore, desirable to satisfy the temperature requirements above outlined and to employ that concentration of zinc sulfate solution which, according to stoichiometric calculations, will serve to precipitate the lead. It is to be appreciated that in the above discussed reaction, we are dealing with the chemistry, not of a water solution, but of a sodium chloride solution of the lead compound containing sodium, lead and chlorine ions. When the hot solution is cooled, what is believed to be a compound of the formula $xPbCl_2.yNaCl$ crystallizes out, hence the avoidance of the formation of such a precipitate is necessary.

The lead sulfate thus precipitated may be removed from the solution by any suitable filtering apparatus or equivalent procedure and dried and subsequently treated as desired for use in the industries. It will be washed with water and other treatments employed to insure a suitable purification thereof.

The solution resulting from this precipitation treatment contains zinc, sodium, chlorine and sulfate ions. In order to recover the zinc therefrom, the solution may be treated with dry sodium carbonate or with any suitable solution containing sodium and the carbonate ions, whether or not other elements or ions, such as hydroxyl, sulfate and chlorine, are present, provided the precipitated product is the desired zinc carbonate. The term "sodium carbonate" as herein used is, therefore, intended to cover all such equivalent reagents, whether derived from natural or artificial sources and whether used as dry salts or as solutions thereof and without regard to harmless impurities or reagents associated therewith. If hydroxyl ions are present, the precipitate may be basic zinc carbonate, but the product is herein termed a carbonate. For example, a strong solution of sodium carbonate tends to hydrolyze and to result in the formation of a basic carbonate of the variable formula $xZn(OH)_2.yZnCO_3$, the variations in composition depending on the temperature of precipitation, etc. One may also precipitate the zinc as the hydroxide by means of sodium hydroxide. This serves likewise to leave sodium, chlorine and sulfate ions in solution; hence the remainder of the process may be carried on as herein described. Neither the carbonate nor the hydroxide of sodium leaves new and undesired ions in the solution. The various precipitating steps will be carried on under suitable conditions of temperature, rate of adding the reagents, agitation of the solution, etc., as are desirable. The result of treating this zinc bearing solution with the carbonate salt leaves the zinc wholly as a precipitate, and the proportions of the ingredients will be in such amounts as are found by analysis to accomplish the precipitation of all of the zinc from the solution. Then, by filtering off the precipitate and washing it, the zinc compound is recovered. If desired, the zinc compound, whether a carbonate or an hydroxide, may then be calcined under required conditions to convert it to zinc oxide, which is of large use in the industry.

The resultant solution containing sodium, chlorine and sulfate ions is now ready for return to the step of leaching the ore material to remove the lead therefrom. As above suggested, this brine may be heated sufficiently to evaporate water therefrom and cause the crystallization of that excess of the sodium sulfate which is not desired in the brine. Then, the purified brine is returned for solubilizing more of the lead sulfate and/or chloride in the ore material, after its concentration and temperature have been adjusted.

Instead of a brine solution of lead, one may employ soluble lead compounds in water solution, such as lead chloride, nitrate or acetate. The aqueous solution of lead chloride is to be heated, as above described, to hold the lead in a solution which is not quite saturated. Lead nitrate and acetate will also serve for reacting with zinc sulfate with a resultant formation of lead sulfate and zinc nitrate or acetate in solution. The zinc in solution, after separation from the lead precipitate, may be in turn thrown down by the strong sodium carbonate solution, thus leaving sodium nitrate or acetate in solution. Any suitable reagent capable of providing carbonate and/or hydroxyl ions may be used to precipitate the zinc.

Having thus described the invention, what is claimed as new and desired to secure by Letters Patent is:

1. The method of treating a lead and zinc sulfide ore comprising the steps of roasting the ore under oxidizing conditions and forming lead sulfate, dissolving zinc from the ore material as zinc sulfate, dissolving the lead in a hot salt brine and treating the hot solution with the zinc sulfate to precipitate lead sulfate therefrom, and thereafter recovering the lead sulfate.

2. The method of treating a lead and zinc sulfide ore comprising the steps of roasting the ore under oxidizing conditions and forming oxygen compounds of the lead and zinc, dissolving zinc from the ore as zinc sulfate, recovering the lead from the ore residue as a hot sodium chloride solution of lead sulfate and/or chloride, thereafter treating the hot brine with the zinc sulfate and forming a precipitate of lead sulfate and a brine containing zinc chloride, recovering the lead sulfate and treating the brine with a reagent capable of furnishing carbonate and/or hydroxyl ions and precipitating the zinc for recovery therefrom.

3. The method of claim 2 in which the zinc is precipitated by sodium carbonate and/or hydroxide and the resultant solution containing sodium chloride is available for dissolving more lead.

4. The method of recovering lead from an ore material containing lead sulfate and/or chloride comprising the steps of solubilizing the lead compound and separating it from the ore material as a hot brine solution containing lead, sodium and chlorine ions, treating the brine, while heated to a temperature at which the lead remains in solution, with zinc sulfate in stoichiometric proportions and forming a precipitate of lead sulfate, and thereafter separating the precipitate from the brine solution and recovering the lead sulfate.

5. The method of treating an ore material containing lead chloride and/or sulfate comprising the steps of dissolving the lead in a strong sodium chloride brine at about 75° C., thereafter heating the brine to a temperature at which it is not saturated with respect to the lead and sodium ions and treating the heated brine with zinc sulfate and precipitating lead sulfate therefrom, and recovering the lead sulfate.

6. The method according to claim 5 in which the final solution is treated with sodium carbonate and/or hydroxide and the resultant precipitate is thereafter removed from the solution and calcined to form zinc oxide.

7. The method of treating a complex lead and zinc sulfide ore comprising the steps of roasting the ore to provide oxygen compounds of lead and zinc, dissolving the zinc compound as a sulfate, recovering the lead as a hot sodium chloride solution of lead sulfate and/or chloride, treating the brine solution with zinc sulfate proportioned to precipitate lead sulfate therefrom, removing the lead sulfate, thereafter treating the residual solution with a reagent capable of furnishing carbonate and/or hydroxyl ions and precipitating the zinc for removal from the solution, whereby both lead and zinc are recovered serially from the ore.

8. The method according to claim 7 in which lead sulfate is initially dissolved in a hot sodium chloride brine and the last stage brine which is free from lead and zinc compounds is heated to evaporate the water and crystallize sodium sulfate therefrom and the sodium chloride brine is then returned for dissolving more lead sulfate derived from the ore.

9. The method of recovering lead from its sulfide ore comprising the steps of roasting the ore and forming lead sulfate, dissolving the lead sulfate in a hot salt brine, treating the brine, while heated to a temperature at which the lead salt is soluble, with zinc sulfate in amount required to precipitate lead sulfate and form zinc chloride in solution, separating the solution from the precipitate, recovering the lead sulfate and thereafter precipitating the zinc from the solution and recovering a compound thereof.

THOMAS A. MITCHELL.